US007423588B1

(12) United States Patent

Rauch

(10) Patent No.: US 7,423,588 B1

(45) Date of Patent: Sep. 9, 2008

(54) PHASED ARRAY ANTENNA SYSTEM

(75) Inventor: Charles T. Rauch, Barnesville, GA (US)

(73) Assignee: PDS Electronics, Inc., Akron, OH (US)

( * ) Notice: Subject to any disclaimer, the term of this patent is extended or adjusted under 35 U.S.C. 154(b) by 67 days.

(21) Appl. No.: 11/435,071

(22) Filed: May 16, 2006

Related U.S. Application Data

(60) Provisional application No. 60/682,740, filed on May 19, 2005.

(51) Int. Cl.
*G01S 3/16* (2006.01)
*G01S 3/28* (2006.01)

(52) U.S. Cl. ........................ 342/383; 342/372; 342/375

(58) Field of Classification Search ................. 342/368, 342/372-373, 375, 383; 257/499, 522, 506
See application file for complete search history.

(56) References Cited

U.S. PATENT DOCUMENTS

| | | | | |
|---|---|---|---|---|
| 3,192,525 A * | 6/1965 | Morgan et al. | .............. | 342/373 |
| 3,275,950 A * | 9/1966 | Birr | ........................... | 332/180 |
| 5,266,869 A * | 11/1993 | Usami | ........................ | 315/170 |

* cited by examiner

*Primary Examiner*—Dao L Phan
(74) *Attorney, Agent, or Firm*—Renner, Kenner, Greive, Bobak, Taylor & Weber

(57) ABSTRACT

The present antenna system includes a phased array antenna system comprising a limiting circuit, an isolation circuit, and a phasing circuit. The limiting circuit includes a system of fast signal diodes coupled with a zener diode, which provides sharp limiting and increased limiting thresholds to received signals. In addition, the isolation circuit prevents a cable coupled to the output of the antenna unit from becoming electrically coupled with the antenna element itself. Furthermore, the phasing circuit allows the present antenna system to provide a null in a fixed direction over a wide bandwidth of signal receiving frequencies.

19 Claims, 3 Drawing Sheets

PHASED ARRAY ANTENNA SYSTEM

CROSS-REFERENCE TO RELATED APPLICATION

This application claims the benefit of U.S. Provisional Application No. 60/682,740, filed May 19, 2005.

TECHNICAL FIELD

Generally, the present invention relates to a phased array antenna system. Specifically, the present invention pertains to a phased array antenna that provides input protection from transient signals. More specifically, the present invention relates to a phased array antenna system that provides input protection that has sharp limiting characteristics, and a high limiting threshold. Particularly, the present invention pertains to a phased array antenna that isolates an element transmission line or connection line from the antenna element itself. More particularly, the present invention is directed toward a phased array antenna having a phasing circuit configured to maintain a desired phase delay over a wide bandwidth of received signals.

BACKGROUND ART

Input protection devices commonly found on antennas are configured to prevent unwanted transient signals, such as current spikes, from propagating through the supporting circuitry attached to the output of the antenna. These transient signal spikes may be caused by various phenomena including static electricity, noise, or may result from the presence of a large transmitted signal. However, to attenuate these transients, various limiting systems have been utilized, but suffer from inadequate performance or create unwanted characteristics that impede the antenna's overall performance.

One such limiting system utilizes a pair of parallel, oppositely connected, signal diodes as a limiting circuit to achieve input protection for the remaining portion of an antenna's supporting circuitry. Because the diodes conduct some amount of current between their on and off states, the system provides "soft" limiting. Furthermore, when the diodes conduct signals that are below the threshold values established by the diodes, unwanted distortion of the received signal generally results. Additionally, if multiple signals are detected by the antenna, intermodulation distortion, or IMD, may occur due to the design of the limiting network. Furthermore, the low voltage threshold of the diodes results in the possibility that a large out-of-band signal may drive the diodes into their limiting region. As a result, IMD may be induced in the desired in-band signals being received by the antenna. To overcome the low voltage threshold, inherent with the parallel diode limiting circuit, several diodes are typically arranged in series in each parallel leg of the limiting circuit, thereby increasing the overall threshold voltage of the limiting system. However, while the threshold voltage of the system is increased, thereby reducing the amount of distortion that may be induced into the system, the limiting characteristics of the system are further degraded or "softened." As such, there is a trade-off between having high limiting thresholds, and "hard" limiting, with the selection of one characteristic resulting in the degradation of the other.

Another commonly used limiting circuit which provides input protection for active antennas utilizes series connected zener diodes, with their anodes coupled together, or with their cathodes coupled together. Because zener diodes, when reverse biased, have a threshold voltage much greater than conventional diodes, the limiting network overcomes the problems of low threshold voltage associated with the previously discussed system. However, this limiting network reduces the performance of the antenna to which the limiting network is coupled due to the zener's high capacitance, and slow switching action between the forward biased zener diode's on and off states. Additionally, the capacitance of the zener diode increases greatly in a non-linear manner as the applied voltage from the signal increases, resulting in IMD and other distortion forms being introduced into the antenna network. Also because of the slow switching action between the on and off states of the forward biased zener diode, distortion of a received signal can also result after a transient signal has decayed after being limited by the system.

Phasing networks or circuits used in conjunction with a phased array antenna system are used to establish a directional receiving pattern. Of primary importance are the location of nulls in the antenna's receiving pattern, and the orientation of the null in a desired direction. As a result, the phase array antenna is insensitive to signals arriving at the antenna in the direction of the null, while the remaining portion of the antenna's receiving pattern continues to be sensitive to transmitted signals. To achieve the delay necessary to create a directional receiving pattern, one or more delay lines, each typically comprising a specific length of coaxial cable of a length corresponding to a desired phase delay are used. However, because these delay lines are frequency dependant, the amount of phase delay provided changes as the signal frequency detected by the antenna array is altered. As such, when it is desired that the antenna system be responsive to signals of a new frequency, the delay provided by the delay lines changes. Thus, the null created in a first direction according to the delay provided by the original delay line is altered because the amount of phase delay provided by the delay line has changed due to the new operating frequency of the antenna system.

Therefore, there is a need for a limiting circuit for use with an active antenna that provides sharp limiting action to received signals, while having a high limiting threshold characteristic. Additionally, there is a need for a limiting circuit that can be formed from a small number of components to provide reduced cost and manufacture. Furthermore, there is a need for an isolation circuit that provides isolation between the antenna element and any cable, such as an element transmission line, coupled to the output of an antenna unit. There is yet a further need for a phasing circuit for a phased array antenna system that is frequency independent, and that maintains a null in a desired direction over a wide bandwidth of received signals.

DISCLOSURE OF THE INVENTION

It is thus an object of the present invention to provide a phased array antenna system which provides input protection from transient signals.

It is another object of the present invention to provide a phased array antenna system, as above, which provides sharper limiting to transient signals than prior art phased array antenna systems.

It is still another object of the present invention to provide a phased array antenna system which provides a desired phase delay over a wide bandwidth of received signals.

It is still yet another object of the present invention to provide a phased array antenna system that isolates a transmission line from the dipole elements of the antenna system.

These and other objects of the present invention, as well as the advantages thereof over existing prior art forms, which will become apparent from the description to follow, are accomplished by the improvements hereinafter described and claimed.

In general, a phased array antenna system generating a directional null includes an antenna array having a plurality of spaced antenna units. The spaced antenna units each receive transmitted signals in a null direction. In addition, a transmission line is provided for each said antenna unit, and is used to couple a phasing circuit to the antenna array so as to receive said transmitted signals from said antenna array. The phasing circuit includes a delay line in at least one of said transmission lines. Coupled to the output of one and another transmission lines is a first combiner. The first combiner is configured to combine the received signals into a first output signal. Coupled to the output of the other two transmission lines is a second combiner that is configured to combine said received signals into a second output signal. A generally frequency independent phase inverter receives the second output signal from the second combiner, where the second output signal is phase shifted by 180 degrees. Furthermore, a third combiner is configured to receive the first output signal from the first combiner and the phase shifted second output signal from the phase inverter. The amount of delay provided by each delay line is configured such that the first and second output signals are cancelled by said third combiner, thereby generating the directional null.

In accordance with another aspect of the present invention, a limiting circuit for a phased array antenna unit includes a capacitor and a zener diode coupled in parallel with the capacitor. A first diode is arranged in series with the parallely arranged zener diode and capacitor. Also in a parallel arrangement with the combination of the zener diode, the capacitor, and the first diode is a second diode.

In accordance with another aspect of the present invention, an isolation circuit for isolating an antenna of a phased array antenna unit from a feed line includes a transformer. The transformer includes a first winding and a second winding, such that the first winding is adapted to be coupled to the antenna, while the secondary winding is adapted to be coupled to the feed line. Also coupled to the transformer is a network of inductors, each of which are selected so as to provide an impedance that is generally frequency independent.

In accordance with another aspect of the present invention, a phased array antenna system generating a directional null includes an antenna array having at least two spaced antenna units each receiving transmitted signals in a null direction. Coupled to each antenna unit is a transmission line that are each coupled to a phasing circuit to receive said transmitted signals from said antenna array. The antenna array includes a delay line in at least one of said transmission lines. Additionally, a phase inverter is coupled to the output of the delay line, wherein the phase inverter is generally frequency independent, and shifts the output of said phase inverter by 180 degrees of phase shift. Coupled to the output of the transmission line lacking a delay line is a combiner that is also coupled to the output of the phase inverter. The phase inverter provides an amount of delay, such that the transmitted signals received by the phasing circuit are cancelled at the output of the combiner, thus generating the directional null.

In accordance with another aspect of the present invention, a method for canceling a transmitted signal to generate a directional null includes receiving a transmitted signal at a plurality of antenna units. The signals are received so that each antenna unit receives an individual transmitted signal with a delay corresponding to the relative position of each antenna unit. Next, each of the received signals are delayed by a predetermined amount. Once delayed, the signals are combined into a first group and a second group, wherein the signals of the first and second groups are equal in magnitude and delay. The first group of signals are inverted by 180 degrees of phase shift, wherein the phase shift is independent of the frequency of the signals of the first group. Finally, the inverted first group of signals are combined with the non-inverted second group of signals, whereby the transmitted signal received at the receiving step is cancelled, thus generating the directional null.

A preferred exemplary phased array antenna system incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
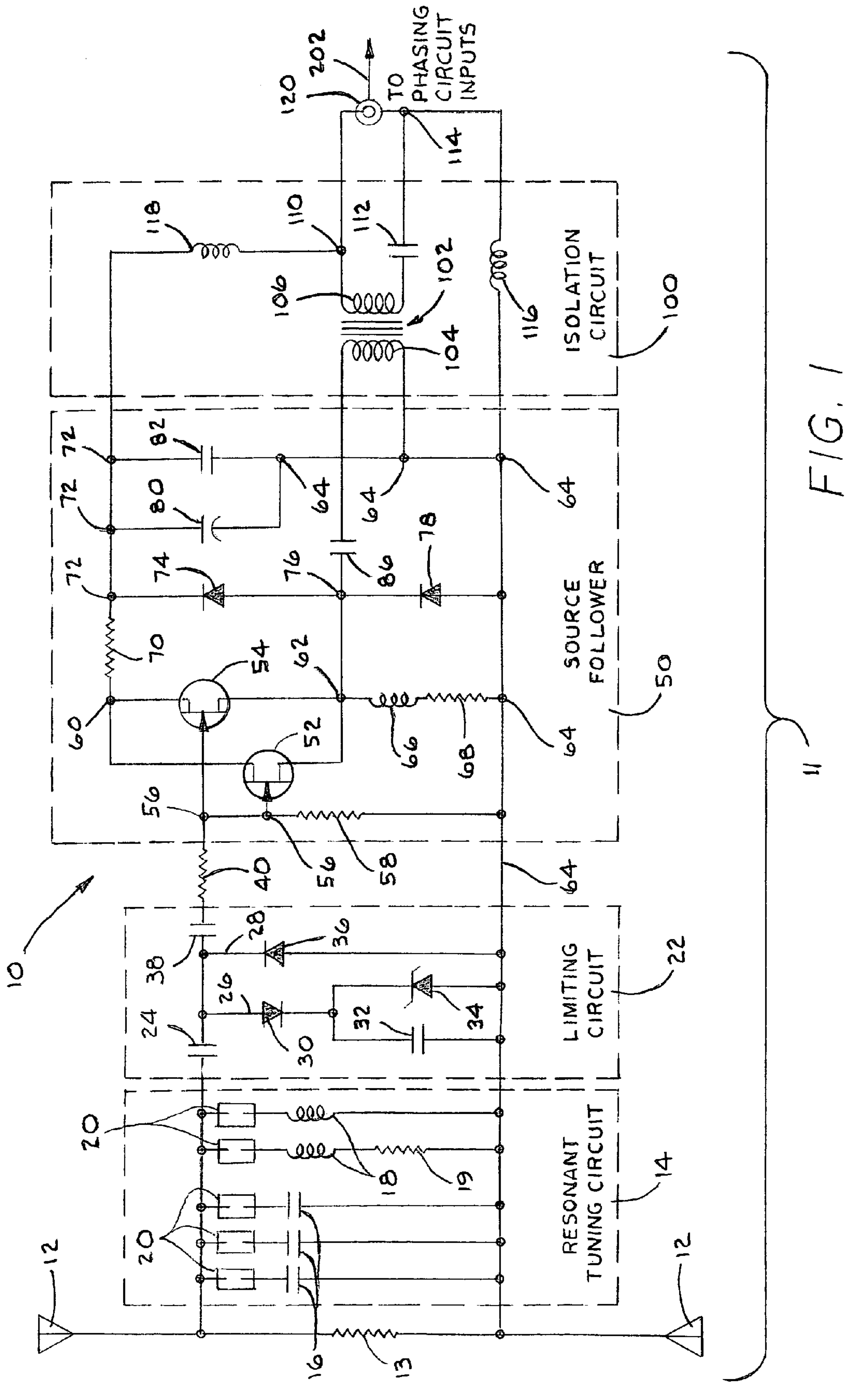
FIG. 1 is a schematic diagram of the antenna unit with input limiting circuitry and isolation circuitry according to the concepts of the present invention.

A phased array antenna system is generally designated by the numeral 10, as shown in the drawings. Antenna system 10 includes an active antenna unit 11, as shown in FIG. 1, which includes a dipole antenna 12 and resistor 13 connected between the dipole feed point terminals. Coupled to the output of dipole antenna 12 is a resonant tuning circuit 14. The resonant tuning circuit 14 contains a plurality of capacitors 16, and a plurality of inductors 18 arranged in parallel. Additionally, a resistor 19 may also be provided in series with one or more of the parallel inductors 18, as shown. The resonant tuning circuit 14 may be user configurable, via one or more jumpers 20, to provide desired tuning to further complement the operating frequency range of the dipole antenna 12. However, it should also be appreciated that the resonant circuit 14 may include a tuning circuit that cannot be adjusted by the user. Coupled to the output of the resonant tuning circuit 14 is a limiting circuit 22. It should be appreciated that the dipole antenna 12 may be comprised of antenna elements that are short, and therefore have minimal mutual coupling.

Limiting circuit 22 provides phased array antenna system 10 with input protection from electrical transients that may result from various sources, including but not limited to, electro-static discharge (ESD) or high power signals that are received by antenna unit 11. Limiting circuit 22 includes a capacitor 24 that couples the output of resonant tuning circuit 14 to legs 26 and 28 of the limiting circuit 22, which are in a parallel configuration with each other. Leg 26 includes a diode 30, which may be in the form of a fast signal diode, however any other type of suitable diode having fast switching characteristics may be utilized. In series with diode 30 and coupled to the cathode of diode 30 is a capacitor 32 and a zener diode 34. Capacitor 32 and diode 34 are in parallel with each other, with the cathode of the zener diode 34 coupled to the cathode of diode 30. As a result of the configuration of capacitor 32 and zener diode 34, a voltage source, having a supply voltage equal to the zener voltage of zener diode 34 is effectively created when a large signal is present. Leg 28 includes a diode 36 that may comprise a fast signal diode, however any other type of suitable diode having fast switching characteristics may be utilized. The utilization of fast signal diodes 30 and 36, in combination with zener diode 34, provide sharp limiting while simultaneously providing a higher limiting threshold to incoming signals than would be otherwise achievable. It should also be appreciated that the voltage supply embodied by the combination of the zener diode 34 and capacitor 32 may also be achieved by other methods, including but not limited to a DC power source or a voltage divider. Finally the output of the limiting circuit 22 is coupled to a source follower 50 via a capacitor 38 and resistor 40, which will be hereinafter discussed.

Briefly, during the operation of the limiting circuit 22, after antenna unit 11 has received an initial number of cycles of a received signal, capacitor 32 will charge to a predetermined DC voltage. The capacitor 32, once charged, holds the zener diode 34 at its zener voltage during the negative cycles of the received signal. Thus, diode 30 will not be forward biased until the anode of diode 30 is greater than the threshold voltage of diode 30 plus the zener voltage selected for zener diode 34. Additionally, if a signal having a magnitude greater than that of the zener voltage of zener diode 34 is received, the magnitude of such signal is limited to a maximum peak to peak voltage that is equal to that of the zener voltage of zener diode 34. Correspondingly, if a signal having a magnitude less than the zener voltage of zener diode 34 is received, the magnitude of such received signal is not limited, and can freely pass through the limiting circuit 22 without attenuation. For example, if zener diode 34 is configured to have a zener voltage of 7V, then a received signal having a peak to peak amplitude of 10V would be limited to a peak to peak voltage of 7V. Alternatively, if zener diode 34 is configured to have a zener voltage of 7V, then a received signal having a peak to peak amplitude of 5V would not be limited by the limiting circuit 22, and would freely pass without attenuation to the source follower 50.

Source follower 50 has a voltage gain of less than unity, and is utilized to transform the high impedance of dipole antenna 12 to a lower impedance, which is seen by the load that may be coupled to the output of the antenna unit 11, such as a receiving unit (not shown) or a phasing circuit 200, which will be discussed later. In addition, the source follower 50 provides a much higher impedance seen by the antenna. Because the impedance of the source follower 50 seen by dipole antenna 12 is higher than the impedance of the dipole antenna 12, the ability of dipole antenna 12 to induce current or signals into the following circuitry is facilitated. Additionally, the source follower 50 serves to provide a stable and fixed impedance to drive an attached load.

Source follower 50 includes a transistor 52 and a transistor 54, as shown in FIG. 1, may comprise n-type JFETs (Junction Field Effect Transistors). However, it is also contemplated that p-type JFET transistors may be utilized to comprise transistors 52 and 54. In addition, a single JFET could be used. Also, other types of buffer circuits, such as an emitter follower using a bipolar transistor could be used. The gates of the transistor 52 and transistor 54 are coupled to node 56 where a biasing voltage is established by a resistor 58. Transistor 52 and 54 are also coupled together via their source and drain connections via nodes 60 and 62. Node 62 is coupled to node 64 via a series connected inductor 66 and resistor 68. A resistor 70 separates node 60 from node 72. A diode 74 is connected to between node 72 and a node 76, whereby diode 74 is oriented with its cathode coupled to node 72 and its anode coupled to node 76. Additionally, a diode 78 is also coupled with its cathode tied to node 76 and its anode coupled to node 64. A capacitor 80 and a capacitor 82 that are in a parallel arrangement are tied to node 72 and to node 64. A capacitor 86 is also used to couple node 76 to the input of the isolation circuit 100 which will be discussed later.

Isolation circuit 100 is provided to isolate any connection used to couple the antenna unit 11 to other components. Specifically, isolation circuit 100 isolates the dipole antenna 12 from the cables used to connect antenna unit 11 to another component, such as the phasing circuit 200, to be discussed. Additionally, the isolation circuit 100 ensures that the impedance of the conductors in a cable, such as a coaxial cable, used to couple the antenna unit 11 to a desired load, have equal impedances to ground. For example, if the impedance to ground for each of the conductors of a cable is not kept equal, a common mode current will be caused to occur on the cable. As a result, the cable will effectively become part of the antenna, thereby altering the physical properties and performance characteristics of the antenna. Because precise balancing of each of the conductors of the feed line are needed for optimal operation of the phased array antenna system 10, the isolation circuit 100 serves to electrically separate the cable from the dipole antenna 12. To achieve this isolation, isolation circuit 100 creates a high impedance path for the common mode current, while simultaneously maintaining the required low impedance to the desired differential signals. The output isolation circuit 100 is also capable of operating over a wide bandwidth or frequency range.

Specifically, isolation circuit 100 includes a transformer 102 having a winding 104 and a winding 106 that are constructed, such that, the capacitive coupling between windings 104 and 106 is reduced. It should also be appreciated that the ratio between winding 104 and 106 may be 1 to 1 and is configured to provide balancing and isolation for the antenna and any load coupled to the antenna unit 11. In one embodiment, transformer 102 may be configured such that windings 104 and 106 are constructed by making windings 104 and 106 on a binocular (2 hole) core. In addition, each winding 104 and 106 is enclosed in a tube constructed from material sold under the trademark TEFLON. As a result, this embodiment of transformer 102 allows the capacitance between the windings 104 and 106 to be reduced.

Winding 104 of transformer 102 is coupled to capacitor 86 and to node 64, provided in source follower 50. Correspondingly, winding 106 is coupled to a node 110 and a capacitor 112 that is tied to a node 114. An inductor 116 is coupled between node 64 and node 114, and serves to isolate dipole antenna 12 from the output of the isolation circuit 100. Another inductor 118 is also coupled between node 72 and node 110. In addition, the inductance values and inductor types for inductors 116 and/or 118, may be selected such that the shunt reactance of the inductors 116 and/or 118 approximately cancels the shunt reactance of transformer 102 over a wide frequency range. As a result, isolation circuit 100 achieves a high impedance over a wide frequency range. It should be appreciated that inductors 116 and 118 may comprise a choke or other inductor having the characteristics of a high impedance over a wide bandwidth or frequency range. It is also contemplated that isolation circuit 100 be configured, such that, the amount of capacitive reactance between windings 104 and 106 of transformer 102, be of a value complementary to the reactance values of inductor 116 and/or 118.

A connector 120 is provided by the present system 10 to allow signals passing through the antenna unit 11 to be transferred from the antenna unit 11. Specifically, connector 120 is a two (2) conductor connector allowing node 110 and node

114 of the antenna unit 11 to be individually connected to an element transmission line 202. It should be appreciated that connector 120 may comprise a coaxial-type connector or other suitable connector type.

Element transmission line 202 is used to couple the active antenna 11 to a phasing circuit 200. One end of the element transmission line 202 is coupled to connector 120 of antenna unit 11, while the other end of element transmission line 202 is coupled to a connector 120 provided by the phasing circuit 200, which will be hereinafter discussed. The element transmission line 202 typically comprises a coaxial cable, however any other suitable multi-conductor line may be used.

Figure 2A:
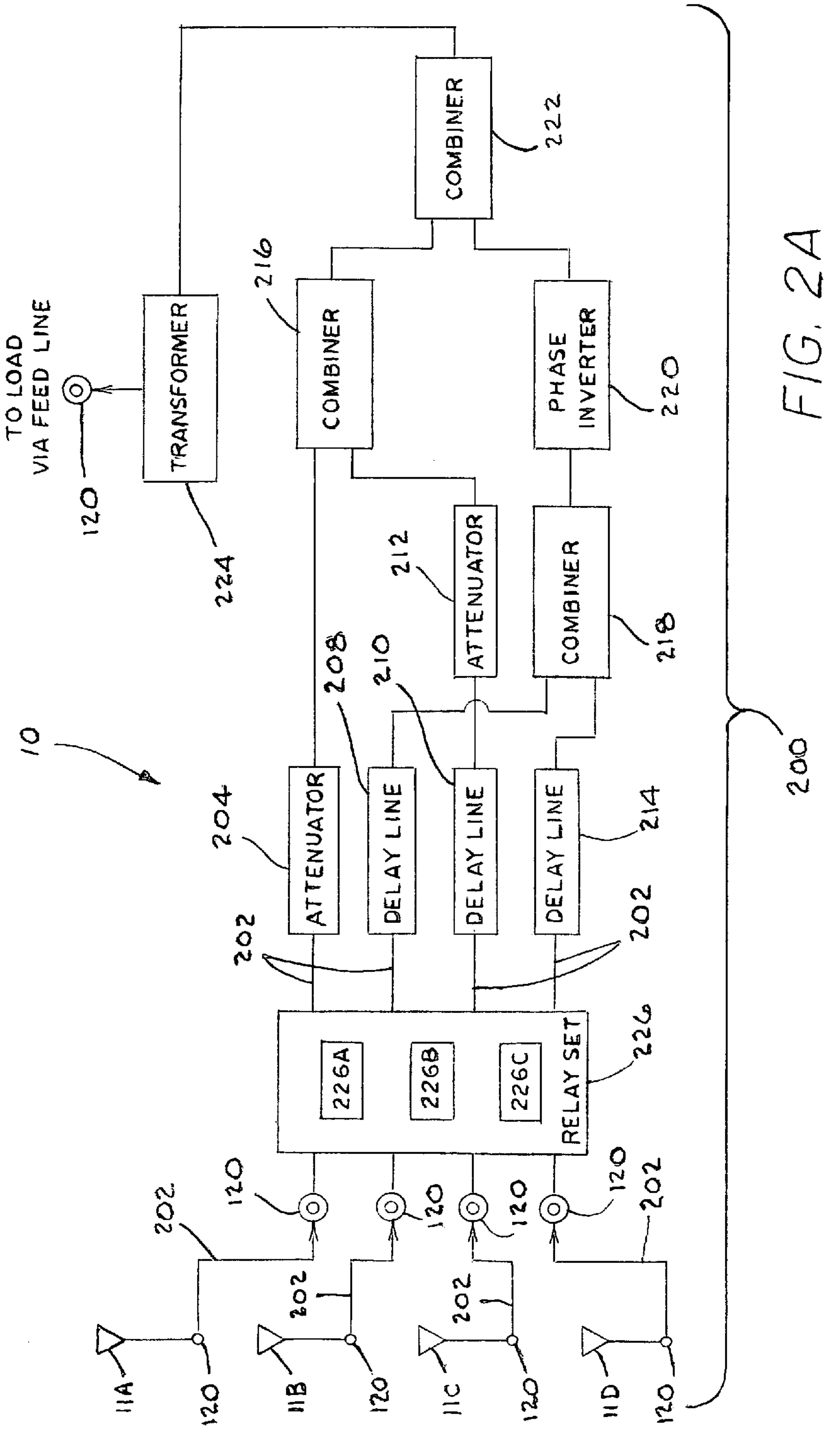
FIG. 2A is a block diagram of the phasing circuit according to the concepts of the present invention.

FIG. 2A shows a block diagram of a phasing circuit 200 in accordance with the concepts of the present antenna system 10. The phasing circuit 200 is designed to create a directional antenna pattern, especially to generate nulls, or areas in the receiving pattern of an antenna that are not sensitive to transmitted signals. As a result, a directional antenna is created. The phased array antenna of present invention 10 includes an antenna array 201 comprising four (4) active antenna units 11A, 11B, 11C, and 11D which are coupled to the phasing circuit 200, as discussed below. A directional antenna pattern, including directional nulls, is generated by phasing circuit 200 by delaying each signal received by the individual antenna units 11A-D by a predetermined amount. Thus, when each of the four (4) signals received in the null region of the antenna array 201, and processed in a manner to be described are combined the signal is effectively cancelled. As such, only signals arriving at the antenna units 11A-D in a direction not defined by a null are passed through the phasing circuit 200 and into an attached load, such as a receiver.

Figure 2B:
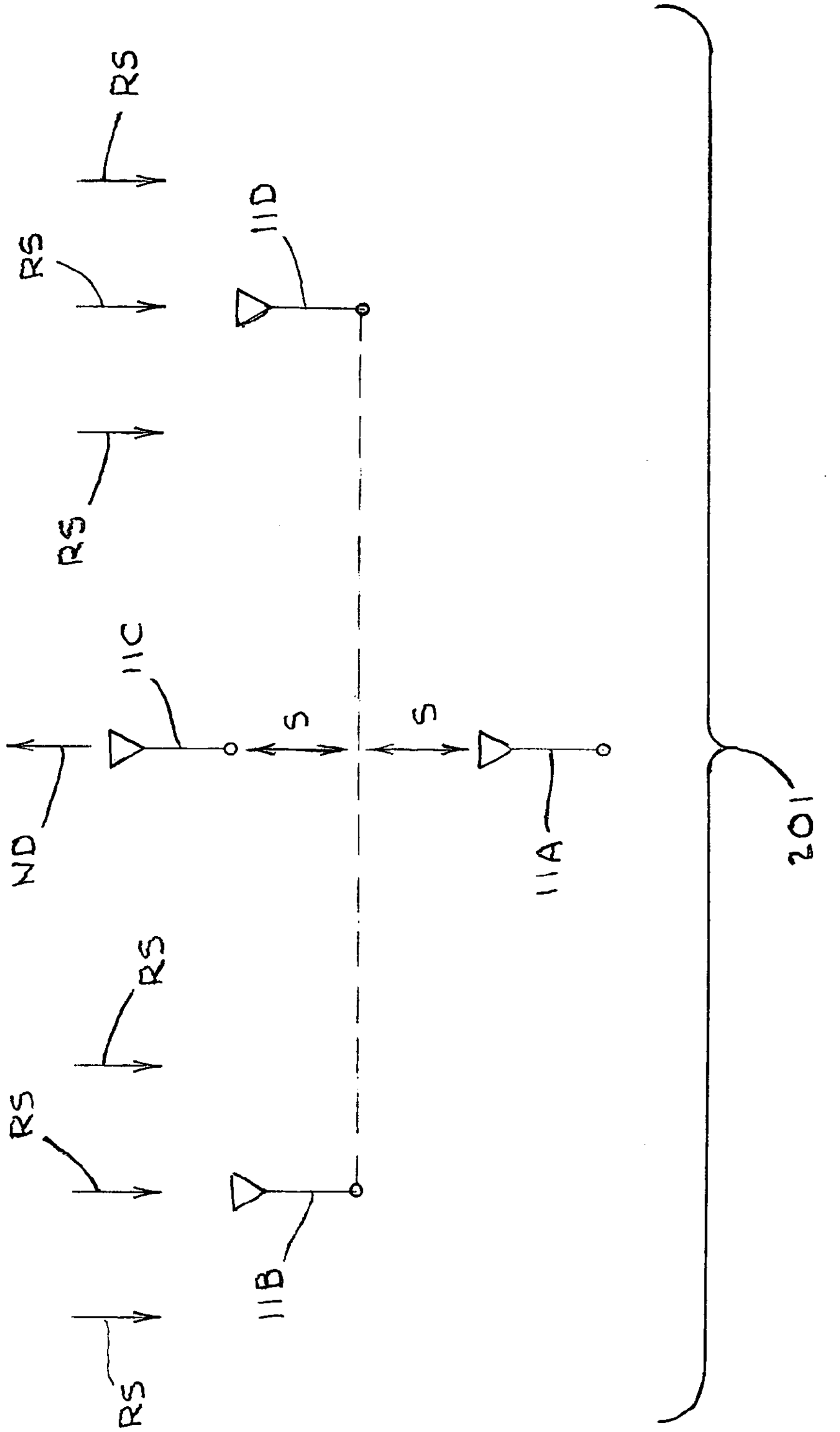
FIG. 2B is a diagram showing the particular arrangement of the antenna units, utilized with the phasing circuit shown in FIG. 2A.

Phasing circuit 200 shown in FIG. 2A is coupled to four (4) antenna units 11A-D which are functionally equivalent to antenna unit 11 discussed with respect to FIG. 1. Furthermore, the following discussion is based on an antenna configuration, wherein antenna array 201 comprising antenna units 11A-D are arranged in a manner shown in FIG. 2B. In addition, the direction of a signal received (RS) by antenna units 11A-D, and the direction of the desired null (ND), all of which are referenced with respect to antenna unit 11C, are as indicated in FIG. 2B. As such, the received signal (RS) arriving at antenna unit 11C experiences zero (0) signal delay, while antenna units 11B and 11D experiences a delay of S, and antenna unit 11A experiences a delay of 2 S, being the amount of phase delay caused in a received signal due to the physical distance between the antenna units 11A-D comprising antenna array 201.

Each antenna unit 11A-D is coupled to the phasing circuit 200 via an element transmission line 202 using suitable connectors 120 as previously discussed, with respect to FIG. 1. Specifically, each of the four (4) element transmission lines 202 have equal lengths, and each of the four (4) element transmission lines 202 are terminated in its characteristic impedance. As a result, each of the four (4) element transmission lines 202 provide an equal amount of phase delay to signals they carry. It is also contemplated that element transmission lines 202 may be comprised of different lengths, provided that the amount of phase delay provided by the lengths of delay lines 208, 210, and 214 are appropriately adjusted for the phase delay created by element transmission lines 202.

Antenna unit 11A is coupled via element transmission line 202 and connectors 120 to a variable attenuator 204 of phasing circuit 200. The variable attenuator 204 allows for the compensation of delay line attenuation caused in portions of the phasing circuit 200, and other variations that may affect signals received by each of the antenna elements 11A-D. Antenna unit 11B is coupled via element transmission line 202 and connector 120 to a delay line 208 of phasing circuit 200. Delay line 208 typically includes a coaxial cable of a specific length corresponding to the desired amount of delay that is needed to be applied to the signal received by antenna unit 11B to generate a null in the direction of ND shown in FIG. 2B. For example, a delay of S may be created by selecting a suitable length for delay line 208. Antenna unit 11C is also coupled via element transmission line 202 and connectors 120 to delay line 210 of phasing circuit 200. Delay line 210 typically includes a coaxial cable of a specific length corresponding to the desired amount of delay that is needed to be applied to the signal received by antenna unit 11C to generate a null in the direction of ND shown in FIG. 2B. For example, a delay of 2 S may be created by selecting a suitable length for delay line 210. Furthermore, output of delay line 210 is coupled to a variable attenuator 212, which allows a user to adjust the amount of compensation needed to overcome the attenuation of phase inverter 220, which will be discussed later, and to adjust for other variations that may affect signals received by each of the antenna elements 11A-D. It is also contemplated that an attenuator may be placed at other points in the circuit, such as at the output of combiner 218, at the output of phase inverter 220, or at the input of combiner 218, in place of attenuator 212.

Additionally, antenna unit 11D is coupled via element transmission line 202 and connectors 120 to delay line 214 of phasing circuit 200. Delay line 214 typically includes a coaxial cable of a specific length corresponding to the desired amount of delay that is needed to be applied to the signal received by antenna unit 11D to generate a null in the direction of ND shown in FIG. 2B. For example, a delay of S may be created by selecting a suitable length for delay line 214.

With delay now referenced to the input of phasing circuit 200 from antenna unit 11C, and assuming a signal arriving from the null direction ND, the output signal of attenuator 204 having a 2 S delay (due to the physical separation of antenna units 11A and 11C), and the output signal of attenuator 212, after being delayed by 2 S by delay line 210, is passed to combiner 216. Further, output signals of delay line 208 having a 2 S delay (due to the physical separation of antenna units 11B and 11C causing a delay of S, and delay line 208 causing a further delay of S), and delay line 214 having a 2 S delay (due to the physical separation of antenna units 11D and 11C causing a delay of S, and delay line 214 causing a further delay of S), corresponding to antenna units 11B and 11D respectively, are coupled to a combiner 218. Combiners 216 and 218 combine the signals supplied to their inputs. With the magnitude of any of the four (4) signals from antenna units 11A-D being regarded as a reference of one, the output of combiner 216 is a signal with a magnitude of two (2) having a delay of 2 S, and the output of combiner 218 is a signal with a magnitude of two (2) with a delay of 2 S. Specifically, combiners 216 and 218 are configured such that they provide a constant impedance load for attenuators 204 and 212, and delay lines 208 and 214. It should also be appreciated that combiners 216, and 218 may comprise a magic tee, a zero degree hybrid combiner, an in-phase hybrid combiner, or the like. The output of the combiner 218 is coupled to a phase inverter 220.

Phase inverter 220 inverts signals from combiner 218 by 180 degrees of phase shift, regardless of the signal frequency. Thus, the signal provided by combiner 218 is inverted, such that the signal has a magnitude of 2 and a delay of 2 S and shifted by 180 degrees of phase shift. Additionally, the phase inverter 220 can perform this phase shift over a wide bandwidth or frequency range of signals output from the combiner 218. The output of the phase inverter 220, and combiner 216 are coupled into a combiner 222. The combiner 222 is functionally equivalent to combiners 216 and 218. As such, combiner 222 combines the out inverted signal from phase inverter 220 with the output signal from combiner 216. As a result, the signals are cancelled resulting in a null in the direction of ND as shown in FIG. 2B. Finally, the output of the combiner 222 is coupled to a transformer 224. Transformer 224 typically is comprised of an impedance matching transformer, used to match the impedance of a load (not shown), with that of phasing circuit 200. The output of transformer 224 is then typically coupled with a load, such as a receiver, via a feedline (not shown), typically comprising a coaxial cable. It should also be appreciated that the combiners 216, 218, and 220 may be impedance matched to that of the delay lines 208, 210, and 214.

Returning to FIG. 2A, other aspects of phasing circuit 200 will now be discussed below. In particular, phasing circuit 200 is coupled to antenna units 11A-D, via element transmission lines 202 and suitable connectors 120 as previously discussed. Element transmission lines 202 allow the phasing circuit 200 to obtain signals received by each of the four (4) antenna units 11A-D of antenna array 201 as previously described with respect to FIGS. 2A and 2B. The four (4) signals obtained by each of the four antenna units 11A-D are transferred through the element transmission lines to a set of relays 226, which route the received signals to specific portions of the phasing circuit 200 to be discussed. When the relays 226A, 226B, and 226C are in a first position the signal from antenna unit 11A is coupled to attenuator 204. The attenuator 204 allows the phasing circuit 200 to compensate for any attenuation caused by the delay line 208, and any other variations within the phasing circuit 200. Further, the signals from antenna units 11B-D are coupled to delay line 208, delay line 210, and delay line 214, respectively. Delay lines 208, 210, and 214 serve to provide a predetermined amount of time delay to the signals received by antenna units 11B-D. This time delay allows the present system 10 to generate a null in the selected direction ND. The output of delay line 208 and delay line 214 are coupled to combiner 218, where the incoming signals are summed together. Correspondingly, the output of delay line 210 after being processed by the attenuator 212 is coupled to combiner 216, where the signal is combined with the output of attenuator 204. After the signals of combiner 218 have been combined, the phase angle of the output signal is inverted by 180 degrees by phase inverter 220. Phase inverter 220 may include an inverting transformer with a 1 to 1 winding ratio. Next, the output of phase inverter 220 and the output of the combiner 216 are combined by combiner 222. The output of combiner 222 causes the signals from combiner 116 and phase inverter 220 to be cancelled. It should be appreciated that combiners 216, 218, and 222 may be in the form of a magic tee, a zero degree hybrid, or an in-phase hybrid. Additionally, combiners 216, 218, and 222 may include transformers with a 1 to 1 winding ratio. The output signal of combiner 222 is passed through transformer 224, which provides impedance matching for a load, such as a receiver, connected via a feedline, such as a coaxial cable (not shown). Connector 120 is provided to facilitate the connection of such feedline to the output of phasing circuit 200.

It should also be appreciated that the antenna pattern, including the direction in which the null is provided in the receiving pattern of the antenna unit array 201 shown in FIG. 2B may be moved by activating relays 226A, 226B, and 226C in a specific manner. By setting relay 226A to a second position, the pattern is reversed, such that the null direction is moved to antenna unit 11A as shown in FIG. 2B. Thus, signals approaching antenna array 201 from the direction of antenna unit 11A are cancelled by phasing circuit 200. Furthermore, by actuating relays 226B and 226C to move to a second position, the null can be rotated by ninety (90) degrees to provide cancellation of a received signal that approaches antenna array 201 from the direction of either antenna unit 11B or 11D, as shown in FIG. 2B.

It will, therefore, be appreciated that one advantage of one or more embodiments of the present antenna system is that the limiting circuit provides sharp limiting with a high limiting threshold to signals received by an antenna unit. Still another advantage of the present invention, is that the limiting circuit includes a limited number of components, thereby reducing cost of manufacture, while increasing the reliability of its operation. Yet another advantage of the present antenna system is that an isolation circuit is utilized to provide isolation between the dipole antenna and any element transmission line coupled to the antenna unit. Another advantage of the present antenna system is that the antenna receiving pattern can have a null fixed in a desired direction, that does not vary in direction over a wide range of operating frequencies.

What is claimed is:

1. A phased array antenna system generating a directional null comprising:

an antenna array having a plurality of spaced antenna units, said antenna units each receiving transmitted signals in a null direction;

a transmission line for each said antenna unit;

a phasing circuit for each transmission line to receive said transmitted signals from said antenna array, said phasing circuit including:

a delay line in at least one of said transmission lines;

a first combiner coupled to the output of said one of said transmission lines and one other of said transmission lines, said first combiner configured to combine said received signals into a first output signal;

a second combiner coupled to the output of two other of said transmission lines, said second combiner configured to combine said received signals into a second output signal;

a generally frequency independent phase inverter receiving said second output signal from said second combiner, said second output signal phase shifted by 180 degrees; and a third combiner configured to receive said first output signal from said first combiner and said phase shifted second output signal from said phase inverter;

wherein the amount of delay provided by each said delay line is configured such that said first and second output signals are cancelled by said third combiner, thereby generating said directional null.

2. The phased array antenna system of claim 1, wherein said plurality of antenna units comprise:

a dipole antenna;

a resonant tuning circuit coupled to said dipole antenna;

a limiting circuit coupled to said resonant tuning circuit;

an amplifier circuit coupled to said limiting circuit; and an isolation circuit coupled to said amplifier circuit to isolate said dipole antenna from said phasing circuit.

3. The phased array antenna system of claim 2, wherein said isolation circuit provides a higher impedance to common mode signals than for differential signals.

4. The phased array antenna system of claim 2, wherein said isolation circuit provides generally frequency independent output impedance.

5. The phased array antenna system of claim 2, wherein said isolation circuit comprises:

a transformer having a first and a second winding, each wrapped about binocular core.

6. The phased array antenna system of claim 5, further comprising:

a network of inductors coupled to said transformer, wherein the shunt reactance of the inductors cancels the shunt reactance of said transformer.

7. The phased array antenna system of claim 6, wherein said network of inductors comprises one or more chokes.

8. The phased array antenna system of claim 6, wherein the capacitive reactance between the first and second windings is of a value complementary to the reactance values of said network of inductors.

9. The phased array antenna system of claim 2, wherein said limiting circuit comprises:

a capacitor;

a zener diode coupled in parallel with said capacitor; and a first diode arranged in series with said parallely arranged zener diode and said capacitor.

10. The phased array antenna system of claim 9 further comprising:

a second diode arranged in a parallel orientation across the combination of said zener diode and said capacitor, and said first diode.

11. The phased array antenna system of claim 2, wherein said amplifier circuit comprises a source follower.

12. The phased array antenna system of claim 1, wherein said plurality of delay lines comprise coaxial cable.

13. The phased array antenna system of claim 1, wherein one said delay line provides the longest delay, and further comprising:

a variable attenuator for said transmission line that has said delay line with the longest delay, and for said transmission line without any said delay line.

14. The phased array antenna system of claim 1, wherein said delay line coupled to said first combiner has a delay that is twice the delay of each other delay line.

15. A limiting circuit for a phased array antenna unit comprising:

a capacitor;

a zener diode, coupled in parallel with said capacitor;

a first diode arranged in series with said parallely arranged zener diode and said capacitor; and a second diode in a parallel arrangement with the combination of said zener diode, said capacitor, and said first diode.

16. The limiting circuit of claim 15, wherein said first and second diodes comprise fast switching diodes.

17. A phased array antenna system generating a directional null comprising:

an antenna array having a plurality of spaced antenna units, said antenna units each receiving a transmitted signal in a null direction, and wherein each said antenna units includes a limiting circuit that includes:

a capacitor;

a zener diode coupled in parallel with said capacitor;

a first diode arranged in series with said parallely arranged zener diode and said capacitor; and a second diode arranged in a parallel orientation across the combination of said zener diode and said capacitor, and said first diode, wherein each said antenna units also includes an isolation circuit having:

a transformer;

a network of inductors coupled to said transformer;

wherein said isolation circuit provides an impedance that is frequency independent;

a transmission line coupled to each said antenna unit;

a phasing circuit for each transmission line to receive said transmitted signals from said antenna array, said phasing circuit including:

a delay line in at least one of said transmission lines;

a first combiner coupled to the output of said one of said transmission lines and one other of said delay lines, said first combiner configured to combine said received signals into a second output signal;

a second combiner coupled to the output of two other said other of said transmission lines, said second combiner configured to combine said received signals into a second output signal;

a generally frequency independent phase inverter receiving said second output signal from said second combiner, and shifting said second output signal phase shifted by 180 degrees; and a third combiner configured to receive said first output signal from said first combiner and said phase shifted second output signal from said phase inverter;

wherein the amount of delay provided by each said delay line is configured such that said first and second output signals are cancelled by said third combiner.

18. A phased array antenna system generating a directional null comprising:

an antenna array having at least two spaced antenna units each receiving transmitted signals in a null direction;

a transmission line for each said antenna unit;

a phasing circuit for each transmission line to receive said transmitted signals from said antenna array, said antenna array including:

a delay line in at least one of said transmission lines;

a phase inverter coupled to the output of said delay line, wherein said phase inverter is generally frequency independent, and shifts said output of said phase inverter by 180 degrees of phase shift; and a combiner coupled to the output of said transmission line lacking a delay line, said combiner also coupled to the output of said phase inverter, wherein the amount of delay provided by said delay line is configured, such that the transmitted signals received by said phasing circuit are cancelled at the output of said combiner, thus generating said directional null.

19. A method for canceling a transmitted signal to generate a directional null comprising:

receiving a transmitted signal at a plurality of antenna units, such that each antenna unit receives an individual transmitted signal with a delay corresponding to the relative position of each antenna unit;

delaying each of the received signals by a predetermined amount;

combining the signals into a first group and a second group, wherein the signals of the first and second groups are equal in magnitude and delay;

inverting the first group of signals by 180 degrees of phase shift, wherein said inverting step is independent of the frequency of the signals of the first group; and combining the inverted first group of signals with the non-inverted second group of signals, whereby the transmitted signal received at the receiving step is cancelled, thus generating the directional null.

* * * * *

US007423588C1

(12) EX PARTE REEXAMINATION CERTIFICATE (8834th)

United States Patent

Rauch

(10) Number: US 7,423,588 C1

(45) Certificate Issued: Jan. 31, 2012

(54) PHASED ARRAY ANTENNA SYSTEM

(75) Inventor: Charles T. Rauch, Barnesville, GA (US)

(73) Assignee: PDS Electronics, Inc., Akron, OH (US)

Reexamination Request:
No. 90/011,963, Oct. 17, 2011

Reexamination Certificate for:
Patent No.: 7,423,588
Issued: Sep. 9, 2008
Appl. No.: 11/435,071
Filed: May 16, 2006

Related U.S. Application Data

(60) Provisional application No. 60/682,740, filed on May 19, 2005.

(51) Int. Cl.
*G01S 3/16* (2006.01)
*G01S 3/28* (2006.01)

(52) U.S. Cl. ......................... 342/383; 342/372; 342/375

(58) Field of Classification Search ........................ None
See application file for complete search history.

(56) References Cited

To view the complete listing of prior art documents cited during the proceeding for Reexamination Control Number 90/011,963, please refer to the USPTO's public Patent Application Information Retrieval (PAIR) system under the Display References tab.

*Primary Examiner*—James Menefee

(57) ABSTRACT

The present antenna system includes a phased array antenna system comprising a limiting circuit, an isolation circuit, and a phasing circuit. The limiting circuit includes a system of fast signal diodes coupled with a zener diode, which provides sharp limiting and increased limiting thresholds to received signals. In addition, the isolation circuit prevents a cable coupled to the output of the antenna unit from becoming electrically coupled with the antenna element itself. Furthermore, the phasing circuit allows the present antenna system to provide a null in a fixed direction over a wide bandwidth of signal receiving frequencies.

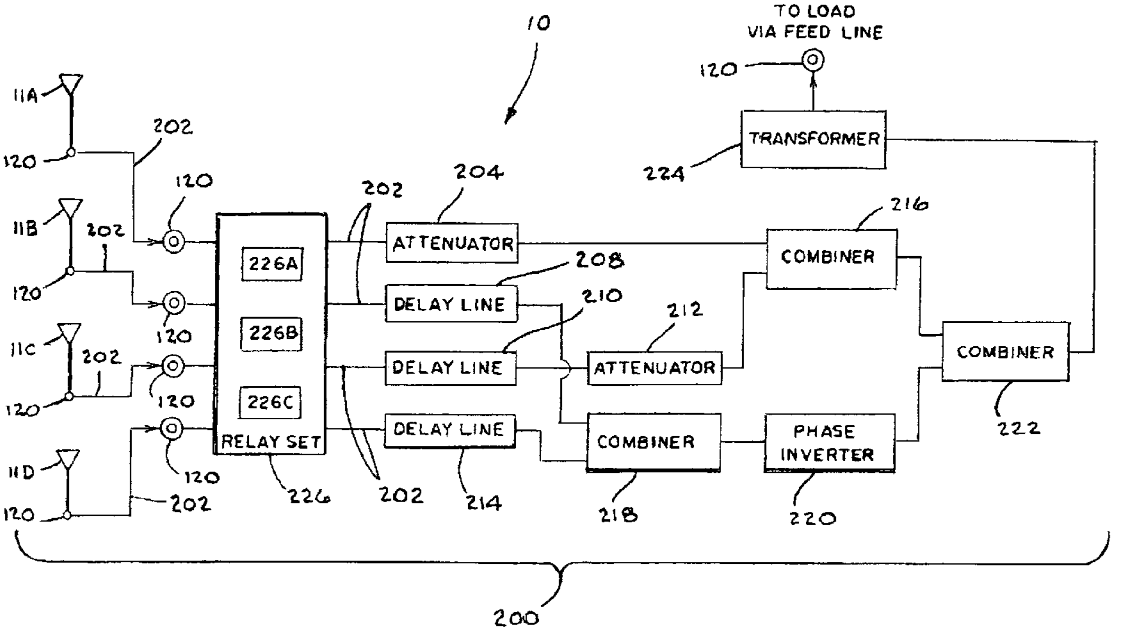

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 15-19 is confirmed.

Claims 2-14 were not reexamined.

* * * * *